Patented Oct. 22, 1940

2,219,129

UNITED STATES PATENT OFFICE 2,219,129

TITANIUM OXIDE PIGMENT AND PROCESS FOR PRODUCING SAME

John A. Geddes, Baltimore, Md., assignor to E. I. du Pont de Nemours & Company, Wilmington, Del., a corporation of Delaware No Drawing. Application September 8, 1938, Serial No. 228,926

13 Claims. (Cl. 134—58)

This invention relates to improvements in inorganic pigments, and particularly to titanium oxide pigments. More particularly it relates to the production of titanium oxide pigments of special and highly improved pigmentary properties. In a more specific sense, it relates to the production of titanium oxide pigments adapted to impart superior gloss and hardness characteristics to coating composition films, and especially to high temperature baking enamels or similar compositions.

It is well known that enamel paints which contain titanium oxide pigments often fail to exhibit desired gloss and hardness values. For instance, when the paint is applied to metal, wood, oil cloth, linoleum, paper, or like surfaces, the resultant film is often objectionable, presenting a dull and matte appearance. This is very evident when such enamel paints contain relatively high percentages of titanium oxide pigments and in baking enamel paints, the films of which are baked at temperatures as high as 175° C. on metal articles, such as refrigerators or the like. In the latter instances, the enamel films exhibit a marked, objectionable tendency towards discoloration or yellowing when baked or employed in inside finishes. A further characteristic disadvantage of such prior enamel paints is their poor "hardness" values and low resistance toward abrasive influences, such as associated articles which cut or scratch the film upon mere contact or accidental impact.

It is an object of this invention to overcome these and other objections in prior inorganic pigment enamel paint films, and more especially to produce a treated titanium oxide pigment which readily imparts excellent gloss and hardness characteristics to enamel paints or similar coating compositions in which the pigment may be employed. A further and particular object includes the provision of a titanium oxide pigment adapted to exhibit high resistance toward yellowing when employed in such paints. A still further object includes the provision of an improved titanium oxide pigment adapted for employment in baked enamel paint films wherein it affords the production of a relatively hard and satisfactory film at baking conditions equal with those ordinarily employed for prior titanium oxide pigments, or films of at least equal hardness upon resort to a shorter period of time and/or at lower baking temperatures. Further objects and advantages will appear as the ensuing description proceeds.

These and other objects and advantages are obtained in this invention, which broadly comprises subjecting inorganic pigments, and especially titanium oxide pigments, to treatment in order to intimately associate therewith, preferably, a relatively small amount of a hydrated, water-insoluble cobalt compound, or suitable mixtures of the same.

In a more restricted sense, the invention comprises adding to an aqueous slurry of the pigment such as titanium dioxide, a relatively small amount of a hydrated, water-insoluble compound of bivalent cobalt, the amount of compound so employed being equivalent to from about 0.002% to about 2% CoO, based on the weight of the pigment treated.

In its more specific and preferred embodiment, the invention comprises adding to an aqueous slurry of titanium oxide pigment cobaltous hydroxide in amount equivalent to from about .005% to about 0.1% CoO, based on the weight of the pigment, thereafter dewatering the pigment slurry, and drying the treated pigment at a temperature not to exceed about 160° C.

For purposes of the invention, the term "gloss" may be defined as the ability of a filmed surface to reflect light regularly. Values for gloss may be determined on the Lange photo-electrical gloss meter, wherein a deflection of the needle employed therein is adjusted to read "100" on an arbitrary scale for a standard sample of polished black glass, and a difference of one point in such scale is material. The method is more particularly described at pages 247–248 of Dr. St. John's translation of Dr. Lange's "Photoelements and Their Application," published in 1938 by the Reinhold Publishing Corporation.

Similarly, paint film "hardness" may be defined as the resistance which an enamel paint film exhibits toward impact, abrasion, cutting, etc., as determined by the "Rocker Value" method, described more particularly under the title "Sward Rocker", pages 296–300 of "Physical and Chemical Examination of Paints, Varnishes, Lacquers and Colors" by Henry A. Gardner, 8th edition, January 1937. In this method, polished plate glass is used as a standard and given a value of "100" on an arbitrary scale, a difference of one point being material on said scale.

In general, the invention may be practically adapted by treating pigments and especially titanium dioxide with a relatively insoluble compound of cobalt, more especially a stable, bivalent cobaltous compound. The compound, or mixtures of the same with other compounds, is associated with the pigment by adding the same directly thereto or forming the compound in situ in the presence of the pigment while the latter is in an aqueous slurry suspension, to precipitate the same onto the pigment particles. After intimate association has been effected, the treated pigment, while preferably in dry state, is subjected to milling in a conventional type of milling means, such as a rotary hammer mill or disintegrator, after which it is then ready for any desired use.

In a preferred embodiment, water-insoluble cobaltous hydroxide is employed as the pigment treating agent, and incorporated in the pigment by adding to an aqueous pigment slurry about .005% to about 0.1%, calculated as CoO and based on the weight of the pigment present, of a water-soluble cobaltous salt, such as cobaltous sulfate or nitrate, or other normal or complex cobaltous salt. Thereafter, an alkaline reacting material or admixture of such materials which are solid or liquid at temperatures of about 25° C., such as soluble hydroxides, carbonates, and/or aluminates of alkali and alkaline earth metals, such as sodium or barium hydroxide, may be added in amount sufficient to raise the pH of the slurry to above about 7.0. Precipitation of the cobaltous salt in the form of cobaltous hydroxide onto the pigment becomes thereby effected. The slurry suspension of treated pigment is then suitably dewatered, dried at a temperature of about 150° C. or less, and the pigment dry milled in a rotary hammer mill, to become ready for use.

In order that the invention may be more clearly understood, the following examples are given, each being illustrative only and in no sense limiting:

Example I 0.281 gram cobaltous sulfate $CoSO_4.7H_2O$, dissolved in 50 cubic centimeters water, was added to 4 liters of pigment slurry containing 125 grams calcined titanium dioxide per liter, i. e., the titanium dioxide was treated with cobaltous sulfate in an amount equivalent to 0.015% CoO on the basis of the weight of the pigment. The pigment slurry was agitated thoroughly and then brought to a pH of 7.2 by the addition of 7 cubic centimeters of 25 grams per liter barium hydroxide solution. The pigment slurry was then filtered, the pigment dried at a temperature of 125° C. and then dry milled by passage through a squirrel cage disintegrator. When the so-treated titanium dioxide pigment was formulated in an enamel paint of the drying oil modified polyhydric alcohol-polybasic acid type at a pigment/binder ratio of 1.25/1, the resultant enamel paint, when sprayed on steel panels and baked for 1 hour at 145° C., produced films having a gloss value of 87 when measured on the Lange photo-electric gloss meter described, whereas a like formulation, but containing the same pigment in untreated condition, on comparable test produced films which exhibited a gloss value of 80.

The invention will be found to be also advantageously useful for further improving the pigmentary properties of pigments such as titanium dioxide already treated or to be treated with relatively small amounts of various other metals or metallic compounds, such as aluminum, beryllium, etc., to impart improved chalking, yellowing or discoloration-resistant properties to such pigments. In such instance, desired improvement in gloss and hardness properties of paint films made therefrom will result. Examples of such applications of the invention are included among the following:

Example II 0.281 gram cobaltous sulfate, $CoSO_4.7H_2O$, and 32.7 grams aluminum sulfate, $Al_2(SO_4).18H_2O$, dissolved in 200 cubic centimeters water were added to 2 liters of a pigment slurry containing 250 grams calcined titanium dioxide per liter, i. e., the titanium dioxide was treated with cobaltous sulfate and aluminum sulfate in amounts equivalent to 0.015% CoO and 1% $Al_2O_3$. The pigment slurry was agitated thoroughly and then neutralized by the addition of 1020 cubic centimeters 25 grams per liter barium hydroxide solution. The pigment slurry was then filtered, the pigment dried at a temperature of 115° C. and dry milled by passage through a squirrel cage disintegrator. When the so-treated titanium dioxide pigment was formulated in an enamel paint of the drying oil modified polyhydric alcohol-polybasic acid type at a pigment/binder ratio of 1.25/1, the resultant enamel paint, when sprayed on steel panels and baked for 1 hour at 145° C., exhibited a gloss of 88, as measured on the Lange photo-electric gloss meter. Under the same conditions, a titanium dioxide pigment, treated with hydrated alumina, and otherwise completely similar but lacking the cobaltous compound treatment, produced films having a gloss of only 82.

Example III 5.62 grams cobaltous sulfate dissolved in 800 cubic centimeters water was added with constant stirring to 50 liters of pigment slurry containing 300 grams calcined titanium dioxide per liter. The equivalent quantity of sodium aluminate, i. e., 3.64 grams commercial sodium aluminate comprising 90% $NaAlO_2$ by weight, dissolved in 60 cubic centimeters water, was then added, bringing the pH of the slurry to 7.4, i. e., the titanium dioxide was treated with cobaltous sulfate and sodium aluminate in amounts equivalent to 0.01% CoO and 0.014% $Al_2O_3$. The pigment slurry was filtered, the pigment dried at a temperature of 115° C. and then dry milled by passage through a squirrel cage disintegrator. When formulated in an enamel paint to produce a paint comprising 100 parts pigment to 200 parts by weight of a 50% solution of a drying oil modified polyhydric alcohol-polybasic acid resin in toluene, the resultant paint, when sprayed on steel panels, produced films which when stored in a darkened place for a period of 3 months evidenced but very slight discoloration and yellowing. A like but untreated $TiO_2$ pigment, formulated and tested under the same conditions, produced enamel paint films which discolored and yellowed very badly on storage in a darkened place for a like period of 3 months.

Example IV 8.5 grams cobaltous sulfate, $CoSO_4.7H_2O$, dissolved in 500 cubic centimeters water was precipitated by addition of 80 cubic centimeters 0.75N NaOH. The cobaltous hydroxide precipitate obtained was filtered, reslurried in 435 cubic centimeters water, and added to 10 liters titanium dioxide slurry comprising 2500 grams calcined titanium dioxide previously treated with hydrated aluminum oxide equivalent to 25 grams $Al_2O_3$. The pigment slurry was then agitated thoroughly to insure uniform distribution of the cobaltous hydroxide, after which it was filtered, and the pigment dried at a temperature of 125° C. The dried pigment was then dry milled by passage through a squirrel cage disintegrator. The novel TiO2 pigment obtained, comprising cobaltous hydroxide and hydrated aluminum oxide in amounts equivalent to 0.09% CoO and 1% Al2O3 on the basis of the weight of the titanium oxide, was then formulated in an enamel paint of the drying oil modified polyhydric alcohol-polybasic acid type at a pigment/binder ratio of 1.25/1. The enamel paint so produced was sprayed onto steel panels and baked at 145° C. for stated intervals of time. In accordance with the methods already given, it was determined to have formed films exhibiting hardness and gloss values in accordance with the following table, which directly compares these values with a like TiO2 pigment, comparably tested but containing only hydrated aluminum oxide as a treating agent:

| Pigment | Hydroxides on TiO2 | Minutes enamel paint film baked | Enamel paint film hardness | Enamel paint film gloss |
|---|---|---|---|---|
| Aluminum treated TiO2 | Al(OH)3 equivalent to 1% Al2O3 | 40 | 42 | 83.5 |
| Do | do | 50 | 46 | 83 |
| Do | do | 60 | 48 | 83 |
| Cobalt treated TiO2 | Co(OH)2 equivalent to 0.09% CoO+Al(OH)3 equivalent to 1% Al2O3 | 40 | 55 | 91.5 |
| Do | do | 50 | 61 | 91 |
| Do | do | 60 | 67 | 90 |

When said pigment of this invention was formulated in an enamel paint of the ester gum type comprising 100 parts vehicle solids, 1.2 parts 24% lead naphthenate drier and 0.4 part 6% cobalt naphthenate drier per 100 parts pigment by weight, the paint obtained, when sprayed on steel panels and dried at 25° C., formed films which gave a gloss of 84; while a like enamel paint consisting of the same TiO2 pigment, but treated with hydrated aluminum oxide only, produced films which gave a gloss of only 77 when comparably tested.

*Example V*

2.915 grams cobaltous nitrate, Co(NO3)2.6H2O, dissolved in 150 cubic centimeters water was adjusted to a pH of 8.5 by addition of 25 cubic centimeters 0.75N NaOH. The resultant cobaltous hydroxide precipitate was filtered, reslurried in 145 cubic centimeters water and then added to 10 liters of titanium dioxide slurry, containing 2500 grams calcined titanium dioxide and intimately associated hydrated aluminum oxide, equivalent to 25 grams Al2O3. The resultant treated titanium dioxide comprised cobaltous hydroxide and hydrated aluminum oxide in amounts equivalent to 0.03% CoO and 1% Al2O3. The pigment slurry was then agitated thoroughly to insure uniform distribution of the cobaltous hydroxide, filtered, and the pigment dried at a temperature of 125° C. The pigment was then dry milled by passage through a squirrel cage disintegrator. When formulated in an enamel paint of the drying oil modified polyhydric alcohol-polybasic acid type at a pigment/binder ratio of 1.25/1, the resultant enamel paint, after being sprayed immediately on steel panels, and baked for 1 hour at 145° C., produced films having a gloss value of 89. When said enamel paint was stored for 3 months and then sprayed on steel panels, subjected to baking for 1 hour at 145° C., it produced films also having a gloss of 89, when tested as outlined above. A similar enamel paint, but containing hydrated aluminum oxide-treated titanium dioxide but not cobaltous compound treated, under the same conditions produced films having a gloss of 81 as a freshly prepared paint, and a gloss value of only 79 after storage for a period of 3 months.

While various specific embodiments of the invention have been described in the foregoing examples, these are obviously subject to wide variation and modification. Thus, while preferably treatment of the titanium oxide pigment is effected by adding an aqueous solution of a cobalt salt to an aqueous slurry of pigment and precipitation of a hydrated, water-insoluble cobalt compound on the pigment thereafter effected through addition of sufficient alkaline-reacting material to raise the pH of the slurry above about 7, or as high as desired, the cobalt salt may be added to an alkaline reacting titanium oxide pigment slurry and like precipitation effected; or, if desired, the insoluble cobalt compound may be independently and separately prepared by adding the cobalt salt, or suitable mixtures of the same, to a solution or suspension of an alkaline-reacting material, or vice versa, following which an aqueous suspension of the resultant insoluble precipitant may be added to a pigment suspension for intimate association with said pigment.

Likewise, while specific amounts of hydrated insoluble cobalt compound have been employed in said examples for imparting improved pigmentary properties to titanium dioxide, the invention is not limited to the employment of such amounts. In general, relatively small amounts of treating agent are resorted to since the beneficial effects of the invention thereby accrue without incurring any objectionable effect upon pigment color. The optimum amount of cobalt compound treating agent to be employed in any instance will depend upon and vary with the type and previous history of the titanium oxide pigment, the method of adding such treating agent to the pigment slurry, as well as the chemical composition of the insoluble cobalt compound and properties desired in the finished pigment. When employing cobaltous hydroxide, the preferred hydrated water-insoluble treating agent of this invention, it will be found that appreciable beneficial effects obtain when an amount equivalent to as low as about 0.002% CoO, on the basis of the pigment weight, is employed, and that increased effects accrue when an amount equivalent up to, say, about 2% CoO, on the basis of the pigment weight, is utilized. Very useful and beneficial effects arise in the invention when the amount of cobaltous hydroxide employed ranges from about 0.002% to about 0.5%, calculated as CoO, on the basis of the pigment weight. Preferably, however, and to obtain optimum benefits hereunder, it will be found desirable to employ an amount of cobaltous hydroxide equivalent to from substantially 0.005% to about 0.1% CoO. While the foregoing amounts are indicated as most desirably useful in the invention, it will be apparent that larger amounts and up to, say, an amount equivalent to about 10% CoO, on the basis of pigment weight, may be utilized.

Again, while soluble salts such as cobaltous sulfate and nitrate have been indicated as preferably useful in the invention, it will be apparent that any soluble salt of cobalt which, on reaction with an alkaline agent, yields an insoluble, basic cobaltous compound, may be employed. Thus, in addition to those already named, other normal double or complex cobalt salts may be used, specific examples of which include the cobalto sulfates, particularly those of potassium and sodium, cobaltous chloride, cobaltous fluoride, cobaltous chromate, cobalt chlorate, etc. Similarly, while cobaltous hydroxide, the preferred agent, has been indicated as most useful in the invention, treating the pigment with other basic cobaltous compounds, such as basic cobaltous carbonate, cobaltous oxy-fluoride, cobaltous oxychloride, basic cobaltous sulfate and the like, is contemplated.

While the temperature at which the dewatered pigment of the invention is subjected to drying preferably does not exceed about 160° C., higher temperatures but insufficient to effect decomposition of the cobalt compound treating agent, may be employed, if desired. Similarly, unless the pigment is dried at sub-atmospheric pressures, drying temperatures of less than 100° C. are not desirable, since the process would thereby become too prolonged to be commercially practical. For most purposes, drying temperatures ranging from about 125 to 150° C. will be found to be most adaptable in a practice of the invention.

While the invention has been described in its particular application to the treatment of titanium dioxide, treatment of other types of titanium oxide pigments is also contemplated, all such pigments being preferably subjected to calcination previous to treatment with the insoluble cobalt compound. Accordingly, the term "titanium oxide pigment," as here employed and in the appended claims, is intended to include not only titanium dioxide per se, but all titanium containing pigments, such as the titanates of bivalent metals, titanium dioxide admixed, composited, or extended with other materials, such as extenders or pigments, e. g., zirconium oxide, zirconium silicate, barium titanium silicate, blanc fixe, ground barytes, calcium sulfate, magnesium silicates, clay, lithopone, calcium carbonate, barium carbonate, silica, aluminum silicates, zinc sulfide, zinc oxide, antimony oxide, white lead, alumina, magnesium fluoride, calcium fluoride, etc.

My process possesses advantages not previously combined in a single process. Furthermore, the products of my process possess advantages not previously combined in a titanium oxide pigment material. For example, my novel process allows the production of titanium oxide pigments, such as titanium dioxide, which when employed in enamel paints, produce films of heretofore unrealized high gloss. Furthermore, my process, when applied to aluminum hydroxide treated titanium dioxide pigments, provides pigments which in enamel paints, not only produce films of heretofore unrealized high gloss characteristics, but also produce films which are highly resistant to yellowing. Moreover, the novel products of my invention, when incorporated in baking type enamel paints, provide much harder films than do corresponding enamel paints comprising prior art titanium oxide pigments, when said films are baked under identical conditions. Furthermore, when employing my novel titanium dioxide pigments, films of equal hardness may be obtained in a shorter baking time and/or at reduced baking temperatures.

I claim as my invention:

1. A process for producing an improved titanium oxide pigment comprising intimately associating with said pigment subsequent to calcination and while the same is in aqueous suspension a relatively small amount of a water insoluble basic compound of cobalt.

2. A process for improving the gloss and hardness-imparting properties of previously calcined titanium oxide pigments in paint films, comprising intimately associating with said pigments while in aqueous suspension a relatively small amount of a water-insoluble basic cobaltous compound.

3. A process for improving the gloss and hardness-imparting properties of titanium oxide pigments in paint films, comprising intimately associating with said pigments subsequent to calcination thereof and while the same are in aqueous suspension from .002% to 2%, calculated as CoO, of a water-insoluble, basic cobaltous compound.

4. A process for producing an improved titanium oxide pigment comprising intimately associating with said pigment subsequent to calcination thereof and while the same is in substantially slurry condition a relatively small amount of cobaltous hydroxide.

5. A process for improving the gloss and hardness-imparting properties of previously calcined titanium oxide pigments in paint films, comprising intimately associating with said pigments while in aqueous slurry suspension from .002% to 2%, calculated as CoO, of cobaltous hydroxide.

6. As a new pigment, calcined titanium oxide containing a small amount of a water insoluble basic compound of cobalt, intimately associated with said pigment subsequent to calcination and while the same is in substantially moist condition.

7. As a new pigment, titanium dioxide of improved gloss and hardness-imparting characteristics, said pigment containing as an essential ingredient thereof a small amount of a water-insoluble, basic cobaltous compound, intimately associated with said pigment subsequent to calcination thereof and while said pigment is in substantially aqueous suspension.

8. As a new pigment, titanium dioxide of improved gloss and hardness-imparting characteristics, said pigment containing as an essential ingredient thereof a small amount of cobaltous hydroxide intimately associated with said pigment subsequent to calcination thereof and while said pigment is in substantially aqueous slurry condition.

9. As a new pigment, titanium dioxide of improved gloss and film hardness-imparting characteristics, containing as an essential ingredient thereof cobaltous hydroxide in an amount equivalent to from .002% to 2%, calculated as CoO and based on the weight of the pigment intimately associated with said pigment subsequent to calcination thereof and while said pigment is in substantially aqueous slurry condition.

10. As a new pigment, titanium dioxide of improved gloss and film hardness-imparting characteristics, containing as an essential ingredient thereof cobaltous hydroxide in an amount equivalent to from .005% to .1%, calculated as CoO and based on the weight of the pigment intimately associated with said pigment subsequent to calcination thereof and while said pigment is in substantially aqueous slurry condition.

11. A process for producing a titanium oxide pigment having improved gloss and hardness-imparting characteristics, comprising intimately associating with said pigment subsequent to its calcination, and while the same is maintained in substantially aqueous slurry suspension, a relatively small amount of a water-insoluble, basic compound of cobalt, after treating said pigment with said compound, dewatering the resulting pigment suspension, and then drying the treated product at a temperature insufficient to effect substantial decomposition of said compound of cobalt.

12. A process for producing a titanium oxide pigment having improved gloss and hardness-imparting characteristics, which comprises intimately associating with said pigment subsequent to calcination thereof, and while the same is in substantially aqueous slurry suspension, from about .002% to 2%, calculated as CoO, of a water-insoluble, basic cobaltous compound, thereafter dewatering the treated pigment suspension and drying the resulting pigment product at a temperature not in excess of substantially 160° C.

13. A process for producing an improved titanium oxide pigment comprising precipitating on said pigment, subsequent to calcination thereof, and while the same is maintained in aqueous slurry suspension, a relatively small amount of a water-insoluble, basic cobaltous compound.

JOHN A. GEDDES.